No. 878,619. PATENTED FEB. 11, 1908.
C. ELLIS.
APPARATUS FOR HYDRATING LIME.
APPLICATION FILED SEPT. 6, 1905.

WITNESSES: INVENTOR

UNITED STATES PATENT OFFICE.

CARLETON ELLIS, OF NEW YORK, N. Y.

APPARATUS FOR HYDRATING LIME.

No. 878,619.

Specification of Letters Patent.

Patented Feb. 11, 1908.

Application filed September 6, 1905. Serial No. 277,175.

*To all whom it may concern:*

Be it known that I, CARLETON ELLIS, a citizen of the United States, and resident of New York, in the county of New York and State of New York, have invented certain new and useful Improvements in Apparatus for Hydrating Lime, of which the following is a specification.

This invention relates to apparatus for slaking or hydrating crushed or comminuted lime and has for its object the continuous production of hydrated or slaked lime, more especially in the form of a dry, impalpable or finely divided powder.

The various apparatus for hydrating lime, hitherto proposed, have, in general, been intermittent of operation. Some attempt has been made to dress or treat lump lime in a more or less continuous manner, but so far as I am advised, the dry slaking or hydration of lump lime in this way has not proved successful.

My invention does not concern itself with the dressing or treatment of lump lime but, as above stated, it has to do specifically with means for the handling and suitable hydration of lime in a finely divided, crushed, cracked or comminuted condition; which means operate to bring about a rapid, positive and uniform hydration almost simultaneously throughout the reacting mass.

The present apparatus carries out the operation of hydration or partial hydration in a continuous, rapid and economical manner. Its operation is precise and automatic. The product therefrom is uniformly hydrated to any degree desired. The method or process of continuously slaking or hydrating lime is set forth in the Patents Nos. 800,635 and 807,609, granted to me on Oct. 3, 1905, and Dec. 19, 1905 respectively.

My apparatus comprises a conveyer or series of conveyers or mixers or agitators together with an automatic comminuted lime feeding device and a means for the introduction of water or steam.

Figure 1:
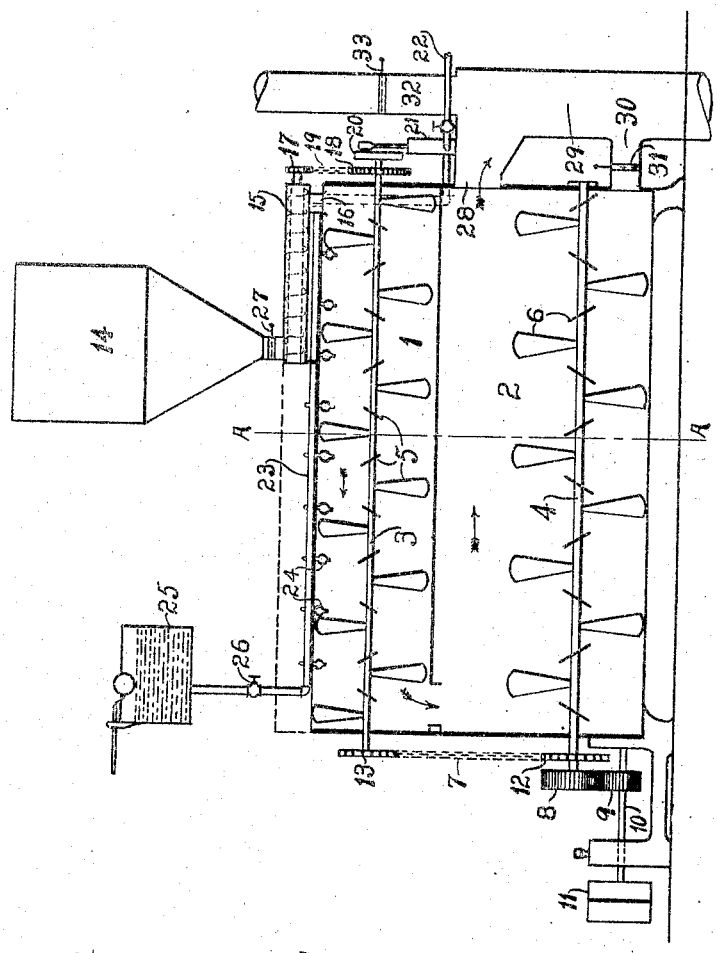
Figure 2:
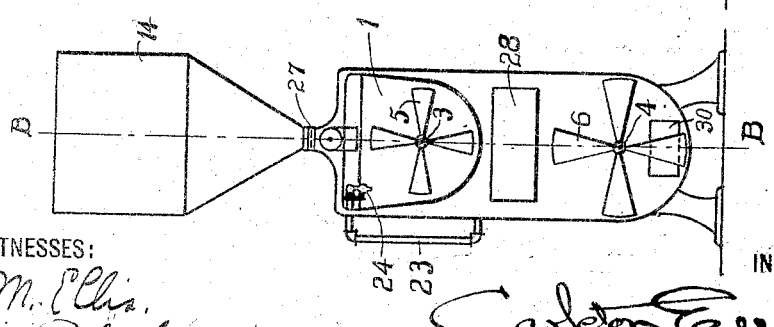

Referring now to the accompanying diagrammatic drawings, Figure 1 shows a longitudinal section of the apparatus along the line B B of Fig. 2. A cross section of the machine is shown in Fig. 2 taken along the line A A of Fig. 1.

Like reference characters denote like parts in the two figures.

In the drawings 1 and 2 represent chambers or troughs in which the operations of mixing and hydrating are conducted. The trough 1 is shown superposed upon the trough 2 as thereby compactness of the apparatus is secured, as also certain other advantages to be hereinafter described. Through the troughs 1 and 2 extend the shafts 3 and 4 respectively which are fitted with conveyer and mixing paddles shown at 5 and 6. The shafts are connected by the chain 7 and sprockets 12 and 13, the shaft 4 being actuated by the gears 8 and 9 and the driving pulley 11 mounted on the shaft 10.

14 is a lime supply bin or hopper, at whose lower end is situated the feeding or measuring conveyer 15 inclosed by a cylindrical tube. It will be evident that while lump lime cannot be fed in any definite and exact manner, comminuted lime, on the contrary, is not open to this objection and may be discharged in a regular and predetermined manner into the upper trough. This is an advantage of no mean importance, as a uniform product is of the utmost importance from the commercial standpoint and only by having means which permit of the regular feeding and mixing of the lime with water necessary for partial or complete hydration can this result be secured. An opening, 16, in this tube permits of the discharge of the quicklime into the upper trough 1. The conveyer 15 is rotated by the chain and sprockets 17, 18 and 19. At 20, 21 is shown a pump for drawing water from the supply-pipe 22 and for forcing this water into the distributing-pipe 23, from which by means of jets or sprayers 24 the water may be discharged into the trough 1 in any desired manner. Attached to the pipe 23 is a water-tank 25 capable of maintaining a constant head of water. A stop-cock 26 interposed in the pipe 23 between the water-tank and sprayers permits of the use of water from this source in lieu of that from the pump, when so desired. The pump however is more positive and more automatic or self-regulating in its action inasmuch as increase in speed of rotation of the shaft 4 causes increase in the amount of water supplied to the trough 1.

27 is a valve or sliding "gate" by means of which the supply of lime may be interrupted when desired. The stop-cocks in the water-pipe also permit of shutting off the water supply when the machine is in motion, if from any cause this is found necessary. By varying the length of stroke of the pump through a variable adjustment in the disk-crank 20 an exact regulation of the water-supply is obtainable. The details of such an adjustment are not shown, being familiar to those skilled in the art.

28 is an opening for the discharge of the slaked lime into the passage 29. A discharge or cleaning opening at 30 is fitted with a sliding "gate" 31. An outlet pipe 32 having a damper 33 serves for the escape of steam and dust.

My method of operation of this apparatus is as follows: Quicklime, either high calcium or dolomitic lime, in a finely divided or crushed condition is placed in the hopper 14 and the "gate" 27 is opened. In case hydration is to be carried out through the agency of water from the pump, the valve 26 is closed. The machine being now set in operation by the rotation of the drive-pulley 11 the following action occurs: Lime from the hopper 14 is fed in a continuous and uniform stream by the conveyer 15 into the trough 1. There it meets with a regulated amount of water from the distributers or sprayers 24. By the rotation of the conveyer blades 5 the lime and water are uniformly mingled and a paste or putty results. This is carried along the trough 1 and in its passage hydration will set in to a greater or less degree depending on the nature of the lime, the size of the lime particles, the temperature of the water and of the trough. The lime putty after traversing the upper trough discharges through an opening in the end thereof into the lower trough, where a more rapid agitation may be maintained. In this trough the hydration is carried on to the extent desired and the material is discharged through the opening 28 for subsequent treatment or immediate use as the case may be. For some limes the lower opening 30 may also be used as a discharge outlet. The amount of water required is dependent upon the degree of hydration desired. Five or six gallons or more of water are needed to completely hydrate 100 pounds of a high calcium lime. For a dolomitic lime or for incompletely hydrated high calcium or dolomitic limes a much smaller amount is needed. In case it is desired to have as few working parts to the machine as possible the pump 21 may be disconnected or discarded and the tank 25 used for supplying the water. This will necessitate in the apparatus as shown the regulation of the supply of water by the valve 26. When the operator has once familiarized himself with the appearance of the putty in the upper trough 1 the adjustment of the water supply is easily made. The sprayers are so situated as to permit of the gradual addition of the water when desired. This is often necessary in the case of a lime possessing clayey or adhesive properties which would otherwise cling to the blades of the conveyer and clog the apparatus.

While it is not recommended that steam be used for the slaking of lime yet it is possible with this apparatus to make use of steam as an auxiliary, introducing it into the distributing pipe 23 and also, if desired, into the trough 2 by any suitable means (not here shown.)

Under certain circumstances screw or other forms of conveyers than those herewith shown may be used in either the upper or lower troughs, as is evident. Means for supplying the lime and water to the mixing mechanism other than those described may also be used as will also be evident to those skilled in the art. Certain devices feeding intermittently but so rapidly that the material is discharged in a substantially uniform stream may be employed for measuring or feeding the finely divided lime. The use of superposed conveyer troughs while not wholly essential is however advantageous because of the increase in rapidity of the slaking in the upper trough due to the heating action of the slaking mass in the lower trough. With troughs otherwise arranged a slower rate of slaking is experienced. For certain limes hydration may be effected by the use of rotatable cylinders, one superposed on the other, and equipped, if desired, with stationary or rotatable scrapers.

My apparatus permits of the manufacture of slaked or hydrated lime in an automatic and continuous manner with a product of great uniformity. By this apparatus hydrated lime may be made at a very low cost for labor and power. With the low prices on hydrated lime now prevailing this economy in its manufacture is of great commercial importance.

What I claim is:

1. In an apparatus for hydrating lime, the combination of a chamber, a continuous lime-feeding mechanism constructed to feed comminuted lime thereto and means for continuously supplying an amount of water automatically proportioned to the amount of lime being fed at a point near the discharge of said lime-feeding mechanism.

2. In an apparatus for hydrating lime, the combination of a chamber, a continuous lime-feeding mechanism, constructed to feed comminuted lime thereto and a pump having operative connection with the lime-feeding mechanism for feeding a proportionate amount of water at a point near the discharge of said lime-feeding mechanism.

3. In an apparatus for hydrating lime, the combination of two or more connected passageways equipped with propelling devices, by means of which material may be caused to travel along said passageways in succession, means for continuously and uniformly feeding finely divided lime and water to the first of said passageways, and the said first passageway being so located as to be heated by a succeeding passageway.

4. In an apparatus for hydrating lime, the combination of a plurality of superimposed receptacles, equipped with conveyers, a passageway connecting said receptacles, an inlet in the upper receptacle for the introduction of crushed lime and water, and means for regulating the proportions of lime and water being fed to the apparatus.

5. In an apparatus for hydrating lime, the combination of a hydration trough, a superimposed mixing trough having an outlet near one end into the hydration trough, and near the other end a lime-feeding conveyer connected to a lime hopper for delivering a supply of crushed lime, a series of water spraying devices located along the top of the mixing trough, and means for regulating the flow of water therethrough.

6. In an apparatus for hydrating lime, the combination of a hydration trough, a superimposed mixing trough, having an outlet near one end into the hydration trough, and near the other end a lime-feeding conveyer connected to a lime hopper for delivering a supply of crushed lime, a series of water spraying devices located along the top of the mixing trough, means for regulating the flow of water therethrough and conveyers located in both troughs, the conveyer in the hydration trough being geared to rotate faster than the conveyer in the mixing trough.

7. In an apparatus for hydrating lime, the combination of an imperforate mixing chamber, means for introducing into said chamber a substantially uniform stream of comminuted lime, means for introducing into the same chamber a regulated supply of water, means for agitating and conveying these materials when in the mixing chamber, and means for externally heating the said mixing chamber.

8. In an apparatus for hydrating lime, the combination of a chamber, mechanism for feeding lime thereto in regulated quantities and means for continuously supplying an amount of water automatically proportioned to the amount of lime being fed at a point near the discharge of said mechanism for feeding lime.

Signed at New York in the county of New York and State of New York this 27th day of June A. D. 1905.

CARLETON ELLIS.

Witnesses:
  B. M. ELLIS,
  WARREN E. DIXON.